United States Patent
Shellans

[19]

[11] Patent Number: 5,953,159
[45] Date of Patent: Sep. 14, 1999

[54] ELECTROMAGNETIC SIGNALING REFLECTOR

[75] Inventor: Mark Honore Shellans, Colorado Springs, Colo.

[73] Assignee: Pathfinder Technology

[21] Appl. No.: 08/964,190

[22] Filed: Nov. 4, 1997

Related U.S. Application Data

[60] Provisional application No. 60/037,360, Feb. 21, 1997.

[51] Int. Cl.⁶ ........................................... G02B 5/12
[52] U.S. Cl. ..................... 359/526; 359/515; 359/520
[58] Field of Search ..................... 359/515, 520, 359/526, 527, 529, 530, 546, 553; 340/947

[56] References Cited

U.S. PATENT DOCUMENTS 4,099,050   7/1978   Sauermann .............................. 359/516
4,307,939  12/1981   Berg ....................................... 359/526

*Primary Examiner*—James Phan

[57] ABSTRACT

An electromagnetic signaling reflector includes a housing (30) having an active position and a stowed position. A plurality of reflective surfaces (32) are contained in the housing (30) and the plurality of reflective surfaces (32) form a retroreflector (34). A modulation device (40) is coupled to the reflective surfaces (32).

11 Claims, 4 Drawing Sheets

ELECTROMAGNETIC SIGNALING REFLECTOR

This patent application claims priority from and is related to the provisional application Ser. No. 60/034,360, entitled "Electromagnetic Retroreflectors capable of Informational Modulation of a Reflected Signal", filed on Feb. 21, 1997.

FIELD OF THE INVENTION

The present invention relates generally to the field of electromagnetic reflectors and more particularly to an electromagnetic signaling reflector.

BACKGROUND OF THE INVENTION

One of the potential applications of the present invention is an emergency beacon. Current emergency beacons use a transmitter to send a signal to search and rescue aircraft. Heavy bulky batteries are required in order to generate a sufficiently strong signal to be detected long ranges. In addition, the batteries must be able to power the transmitter for several hours a day for at least a week. As a result current emergency beacons are expensive, heavy and difficult to transport.

Thus there exists a need for an emergency beacon that overcomes these problems.

SUMMARY OF THE INVENTION

An electromagnetic signaling reflector that overcomes these and other problems includes a housing having an active position and a stowed position. A plurality of reflective surfaces are contained in the housing and the plurality of reflective surfaces form a retroreflector. A modulation device is coupled to the reflective surfaces.

DETAILED DESCRIPTION OF THE DRAWINGS

Figure 1:
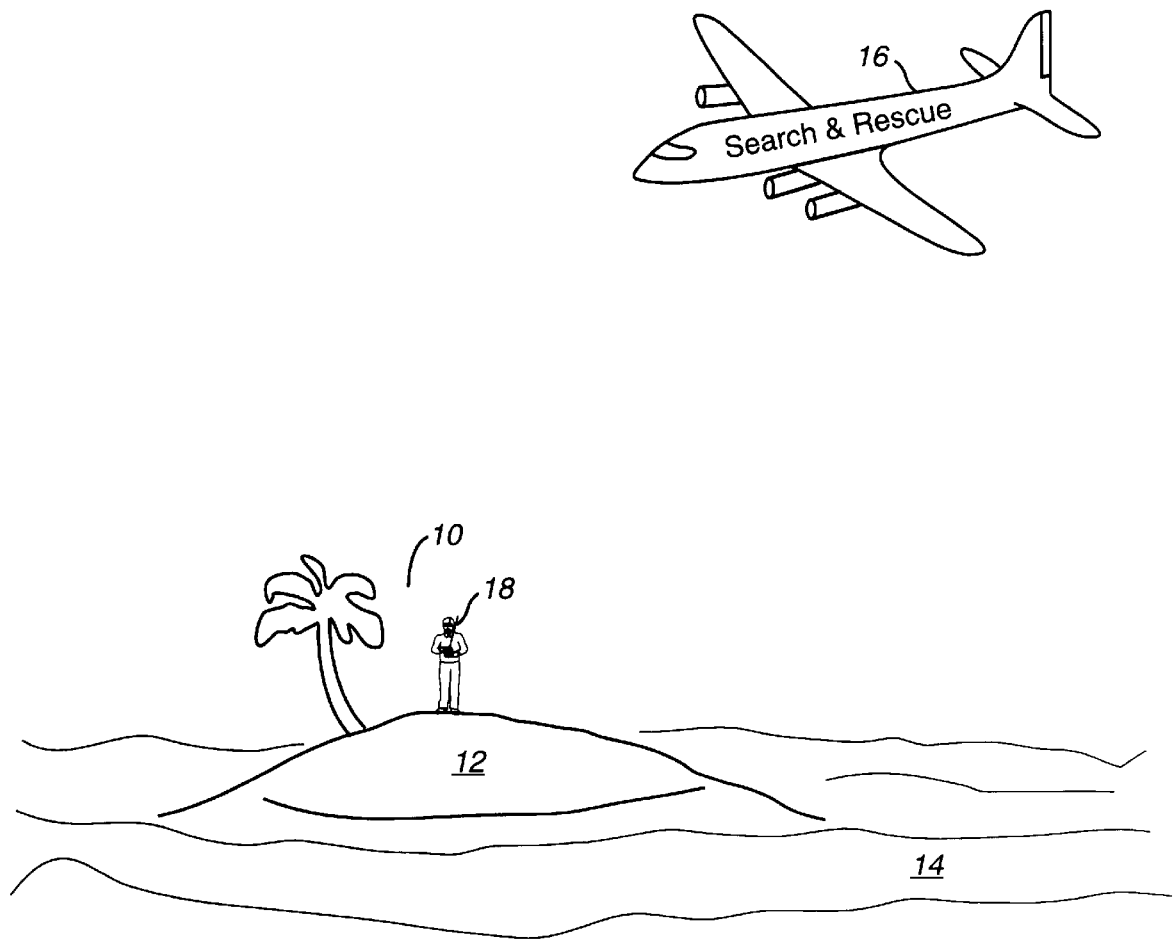
FIG. 1 is a cartoon drawing of a search and rescue mission.

FIG. 1 shows a search and rescue scenario. A person 10 is stranded on an island 12 after his airplane crashed in the ocean 14. A search and rescue aircraft 16 is attempting to find the stranded pilot 10. In an embodiment of the invention, the search and rescue plane 16 includes a radar that uses a scan pattern to locate a returned signal from an electromagnetic signaling reflector 18. While the electromagnetic signaling reflector 18 is shown as being held by the person 10, it could be placed on the ground or in the water.

Figure 2:
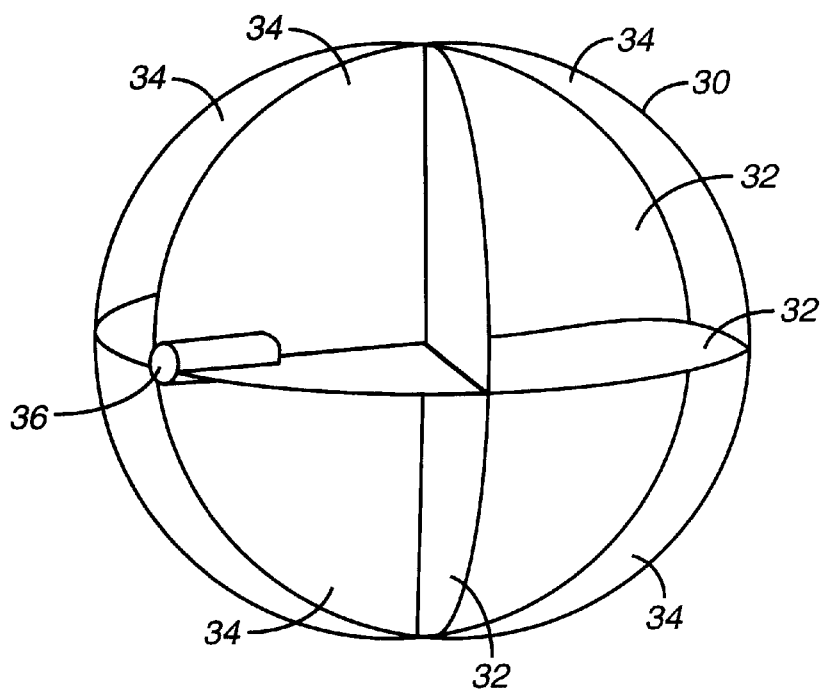
FIG. 2 is an embodiment of a housing of an electromagnetic signaling reflector in an active position.

FIG. 2 is an embodiment of a housing (collapsible housing) 30 of an electromagnetic signaling reflector in an active position (expanded state). The housing 30 is inflatable and is made of a polymeric material. When the electromagnetic signaling reflector is not in use the housing 30 can be collapsed to a flat pancake (stowed position). Contained inside the housing 30 are a plurality of reflective surfaces 32. In one embodiment there are three reflective surfaces 32 inside the spherical housing 30. The three reflective surfaces 32 are circles arranged perpendicular to each other. When the three reflective surfaces 32 are arranged in this manner, they form eight separate trihedral retroreflectors (corner reflectors) 34. The reflective surfaces 32, in one embodiment are made of aluminized mylar.

Figure 3:
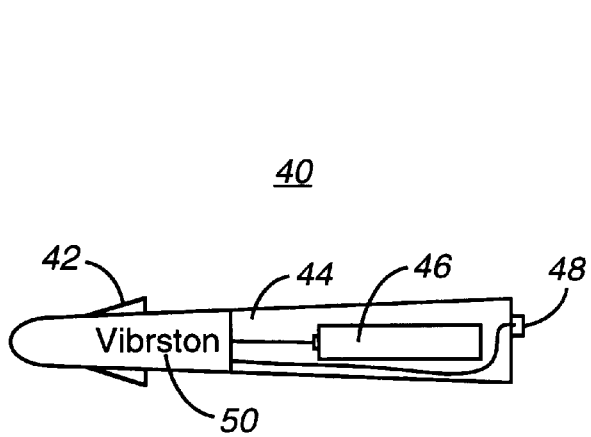
FIG. 3 is an embodiment of a modulation device.

The housing 30 includes an orifice 36 designed to hold a modulation device 40 (see FIG. 3) and for inflating the housing 30. The modulation device 40 includes a plurality of collapsible fins 42 that when inserted into the orifice 36 expand to hold the modulation device 40 in place. The housing 44 of the modulation device 40 has a wedge shape that prevents the device 40 from falling into the housing 30. The modulation device 40 includes a power source 46 connected to an on-off switch 48. The power source 46 is shown as a battery that powers a vibrator 50. When the modulation device 40 is inserted into the orifice 36 and turned on, the retroreflectors 34 are vibrated. When a coherent electromagnetic wave from the search and rescue craft impinges upon the retroreflector 34, the vibration modulates the return signal. This modulation can be detected by a receiver at the search and rescue aircraft. In the preferred embodiment, the physical amplitude of the target vibration is around one-tenth of the electromagnetic wavelength. The vibration of the reflective surfaces will result in a Doppler shift of the reflected waves. In addition, the displacement of the reflective surfaces caused by the vibration will result in phase shifts in the reflected electromagnetic waves. The receiver can look for either a characteristic change in the frequency or phase or both of the reflected wave. Since the electromagnetic signaling reflector is light weight and the amount of vibration required is very small, it requires very little energy to power the vibrator. As a result, a small battery can be used to power the vibrator 50 and still last for several days.

Figure 4:
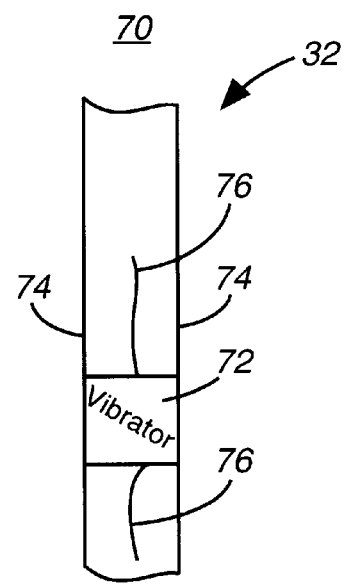
FIG. 4 is another embodiment of the modulation device.

FIG. 4 is another embodiment of the modulation device (modulator) 70. In this embodiment, the reflective surfaces 32 are doubled 74. peizoelectric, voice coil, linear transducer or thin film drivers (vibrators) 72 move adjacent surfaces 74 in opposite dirctions. Since there are no unbalanced forces within the device, this also minimizes external vibration. This arrangement has the added advantage of causing an electromagnetic path length variation of double or triple the linear displacement of any one surface. Because the vibrators 72 are very small, they require very little energy and can be powered by a small battery. In one embodiment the battery is contained between the sheets 74.

Figure 5:
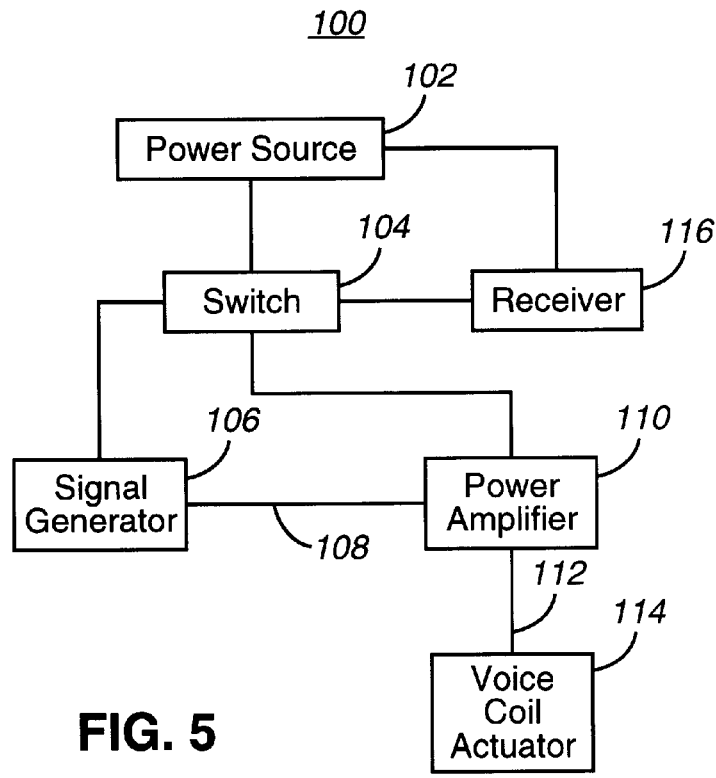
FIG. 5 is a block diagram of an embodiment of the electromagnetic signaling reflector.

FIG. 5 is a block diagram of an embodiment of the electromagnetic signaling reflector 100. A power source 102 is connected to a switch 104. The switch 104 is connected to a signal generator 106. The signal generator 106 creates a drive signal 108 that is amplified by a power amplifier 110. The amplified drive signal 112 is used to drive a voice coil actuator 114. The voice coil actuator 114 physically vibrates the housing 30.

In one embodiment a receiver 116 is included. The receiver 116 is connected to the power source 102. When the receiver 116 detects a search signal, it turns on (sends an activate signal) the switch 104 which starts the voice coil actuator 114 vibrating. The receiver 116 turns off the switch 104, when it no longer detects the search signal. This increases the life of the battery, since the receiver takes significantly less energy than the vibrator.

Figure 6:
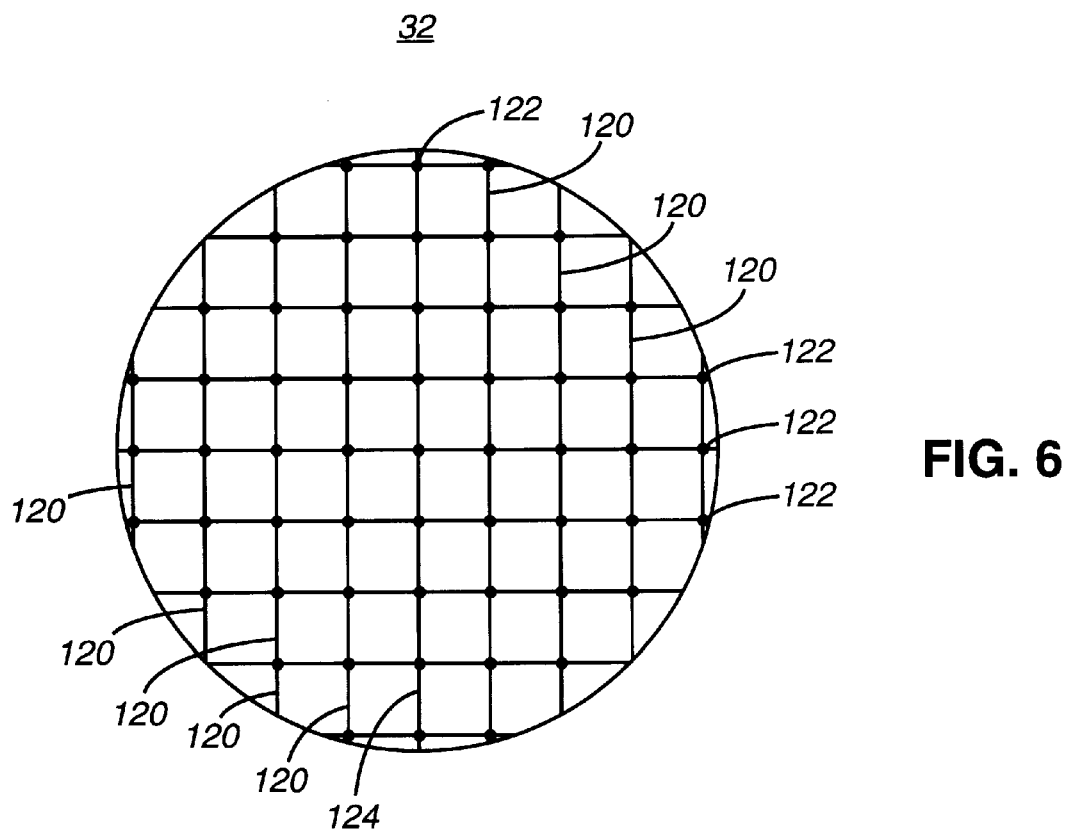
FIG. 6 is an embodiment of a reflector surface used in the electromagnetic signaling reflector.

FIG. 6 is an embodiment of a reflector surface 32 used in the electromagnetic signaling reflector. In this embodiment a plurality of conductive traces (plurality of conductive surfaces) 120 are formed on the surface 32. The plurality of conductive traces 120 are connected together by electronic switches (plurality of switches, plurality of electrical switches) 122. The switches 122 are shown as dots. The length 124 of the traces 120 between the switches is an antiresonance length of the search electromagnetic wave. When the switches are closed the surface 32 is reflective to the search electromagnetic wave and when the switches are open the surface 32 is not reflective (less reflective, reflective properties) to the search electromagnetic wave. By alternatively opening and closing the switches the reflected signal of the search electromagnetic wave is modulated in amplitude. This modulation can then be detected by a receiver at the search and rescue craft.

In another embodiment the housing 30 includes a plurality of conductive traces that form a plurality of polygons. The plurality of polygons each have a smallest distance greater than a first predetermined distance. Note the smallest distance for a square would be the length of one side, while the length of the smallest distance for a rectangle would be the shorter of the two legs. This allows the housing 30 to reject signals that have a wavelength around the first predetermined distance and larger. In another embodiment the reflective surface 32 has a plurality of conductive traces that form a plurality of second polygons. The plurality of second polygons have a second smallest distance smaller than the first predetermined distance and greater than the second smallest distance. This allows the reflective surface to reflect electromagnetic waves having a wavelength around the second smallest distance or greater, but not reflect electromagnetic waves much smaller than the second smallest distance. Using this technique it is possible to select the wavelengths that will be reflected by the corner reflectors (at least one corner reflector) 34.

In another embodiment a reflective shroud is placed over portions of the housing 30. When the electromagnetic signaling reflector is oriented with respect to vertical, then only certain search angles will result in a reflected signal. The housing 30 can be oriented by placing a weight in the orifice 36, for example, and then placing the housing on a calm water surface.

In yet another embodiment, at least one of the reflective surfaces is covered with alternating strips of reflective and transmissive material. This produces an electromagnetic grating. However, other methods of forming a grating are also possible. The grating then produces interference regions in the reflected signal. By vibrating the housing the interference regions would shift past the search craft, causing amplitude modulation of the reflected signal. This modulation can then be detected by the receiver in the search and rescue aircraft.

Figure 7:
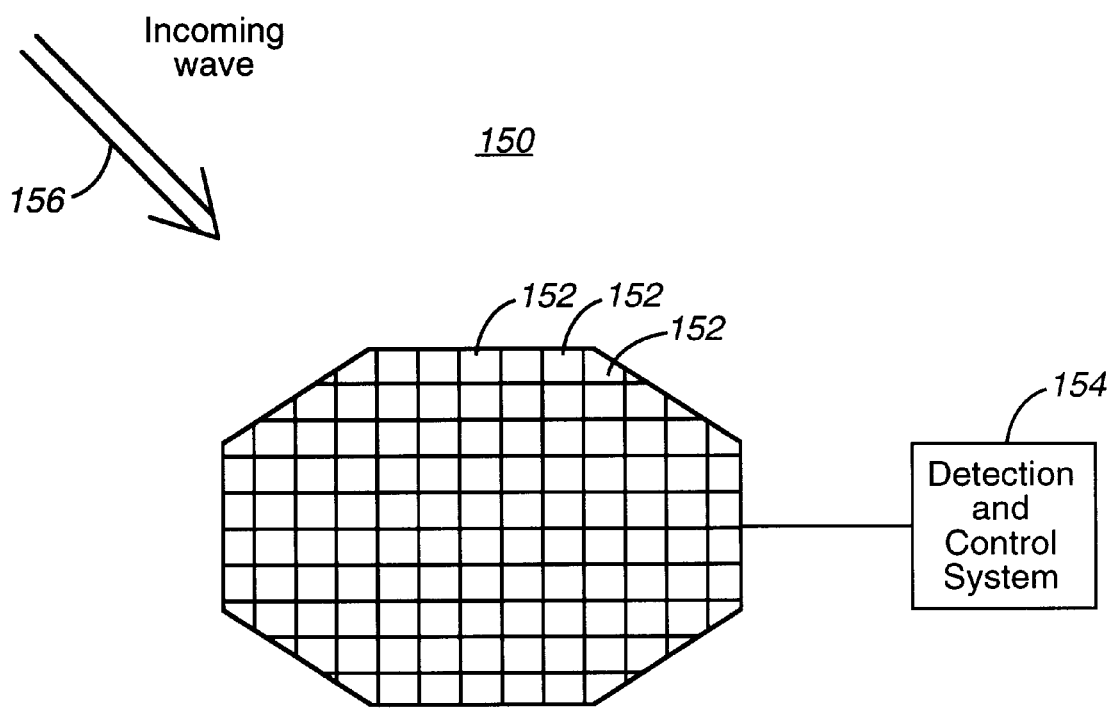
FIG. 7 is a schematic diagram of an embodiment of an electromagnetic signaling reflector.

FIG. 7 is a schematic diagram of an embodiment of an electromagnetic signaling reflector 150. The electromagnetic signaling reflector 150 has a plurality of phase shifters 152 that define a plane (electromagnetic retroreflector). The phase shifters 152 are connected to a detection and control system 154. The detection and control system 154 senses an incoming direction of an electromagnetic wave 156. The detection and control system 154 determines the incoming direction and then computes the appropriate phase for each of the phase shifters 152 to cause the reflected electromagnetic wave to return along the incoming direction. By varying the phases of the phase shifters slightly the direction of the reflected wave can be varied resulting in a change in the received amplitude at the search and rescue craft. In addition, the reflected wave can be phase modulated or even frequency modulated by appropriate changes in the of amount phase shift.

Thus there has been described electromagnetic signaling reflector that can be used as an emergency signaling beacon. The electromagnetic signaling reflector is light weight and does not require heavy bulky batteries to operate. The invention is not limited to an emergency signaling beacon, for instance the invention could be used as an inexpensive corner reflector for ranging, locating and tagging applications. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. An electromagnetic signaling reflector, comprising:

a housing having an active position and a stowed position;

a plurality of reflective surfaces contained in the housing, the plurality of reflective surfaces forming a retroreflector; and a modulation device coupled to the plurality of reflective surfaces.

2. The electromagnetic signaling reflector of claim 1, wherein the housing is made of a polymeric material.

3. The electromagnetic signal reflector of claim 1, wherein the modulation device vibrates the retroreflector.

4. The electromagnetic signaling reflector of claim 1, wherein the modulation device alters a reflective properties of the retroreflector.

5. The electromagnetic signaling reflector of claim 4, wherein the plurality of reflective surfaces comprise a plurality of conductive surfaces.

6. The electromagnetic signaling reflector of claim 5, wherein the plurality of conductive surfaces are electrically connected together by a plurality of switches.

7. The electromagnetic signaling reflector of claim 6, wherein a length of each of the plurality of conductive surfaces is at an antiresonance length to a search electromagnetic wave.

8. An electromagnetic signaling reflector, comprising:

an electromagnetic retroreflector having a plurality of reflective surfaces, each of the plurality of reflective surfaces having a plurality of conductive traces connected together by a plurality of electrical switches; and a modulator coupled to the electromagnetic retroreflector and controlling the plurality of electrical switches, the modulator electronically altering an amplitude of a reflected electromagnetic wave.

9. The electromagnetic signaling reflector of claim 8, further including a receiver coupled to the modulator and initiating the modulator upon detecting an activate signal.

10. The electromagnetic signaling reflector of claim 8, wherein the electromagnetic retroreflector comprises:

a collapsible housing, and the plurality of reflective surfaces contained in the housing arranged to form an at least one corner reflector.

11. The electromagnetic signaling reflector of claim 8, wherein one of the plurality of electrical switches is placed at intervals antiresonant to a search electromagnetic wave.

\* \* \* \* \*